(12) United States Patent
Sendlak et al.

(10) Patent No.: US 10,641,062 B1
(45) Date of Patent: May 5, 2020

(54) DART VALVE WITH CENTRALIZER (71) Applicant: C&J SPEC-RENT SERVICES INC., Houston, TX (US)

(72) Inventors: Christopher Sendlak, Houston, TX (US); Joe R. Harper, Magnolia, TX (US)

(73) Assignee: C&M Oilfield Rentals, LLC, Cody, WY (US)

( * ) Notice: Subject to any disclaimer, the term of this patent is extended or adjusted under 35 U.S.C. 154(b) by 0 days.

(21) Appl. No.: 16/274,063

(22) Filed: Feb. 12, 2019

(51) Int. Cl.
*F16K 1/12* (2006.01)
*F16K 15/06* (2006.01)
*E21B 34/10* (2006.01)
*F16K 1/38* (2006.01)
*F16K 15/02* (2006.01)

(52) U.S. Cl.
CPC .............. *E21B 34/102* (2013.01); *F16K 1/38* (2013.01); *F16K 15/026* (2013.01)

(58) Field of Classification Search
CPC ................................ F16K 15/063; F16K 1/126
USPC ................... 137/542, 543, 543.13, 543.15
See application file for complete search history.

(56) References Cited

U.S. PATENT DOCUMENTS

| | | | | |
|---|---|---|---|---|
| 1,963,685 A * | 6/1934 | Shimer | ............. | F16K 15/063 137/329.04 |
| 2,011,812 A * | 8/1935 | Hatcher | ............. | F04B 53/1027 137/533.23 |
| 2,301,276 A * | 11/1942 | Gussick | ............. | F16K 15/063 137/533.25 |
| 2,882,925 A * | 4/1959 | Smolensky | ............. | F16K 1/34 137/542 |
| 2,927,604 A * | 3/1960 | Johnson | ............. | F16K 15/063 137/514.5 |
| 2,943,639 A * | 7/1960 | Smith | ............. | F16K 15/063 137/515.7 |
| 3,460,805 A * | 8/1969 | Kudlaty | ............. | F16K 1/36 137/529 |
| 3,707,987 A * | 1/1973 | Gordon | ............. | F16K 15/18 137/543 |
| 3,756,273 A * | 9/1973 | Hengesbach | ............. | F16K 15/026 137/540 |
| 3,937,249 A * | 2/1976 | Suey | ............. | F16K 15/063 137/543.13 |
| 4,132,246 A * | 1/1979 | Frisen | ............. | E03C 1/106 137/536 |
| 4,194,527 A * | 3/1980 | Schonwald | ............. | F16K 17/0433 137/543 |

(Continued)

OTHER PUBLICATIONS

Hard Facing Valves; Oscar E. Swenson; Oct. 22, 1950.*

*Primary Examiner* — Marina A Tietjen
*Assistant Examiner* — Paul J Gray
(74) *Attorney, Agent, or Firm* — Morgan, Lewis & Bockius LLP (57) ABSTRACT

A dart valve includes an inlet centralizer to receive a stem extending from the cone body. The inlet centralizer can stabilize the movement of the cone body by constraining the radial movement of the cone body within the housing. Because the radial movement of the cone body is limited, wear and damage to the cone body and other components of the dart valve is minimized. The dart valve can be utilized in high pressure applications and can be used in horizontal and vertical orientations. Because of this, the dart valve can provide reliable operation in various arrangements.

23 Claims, 6 Drawing Sheets

(56) References Cited

U.S. PATENT DOCUMENTS

| | | | | | |
|---|---|---|---|---|---|
| 4,886,085 | A | * | 12/1989 | Miller | F16K 15/063 137/1 |
| 4,951,708 | A | * | 8/1990 | Miller | F16K 15/063 137/526 |
| 5,226,445 | A | * | 7/1993 | Surjaatmadja | F16K 15/063 137/516.29 |
| 5,297,579 | A | * | 3/1994 | McConnell | F16K 15/04 137/515.7 |
| 5,425,397 | A | * | 6/1995 | Mackal | F16K 15/063 137/540 |
| 5,758,682 | A | * | 6/1998 | Cain | F16K 17/40 137/543.13 |
| 6,443,182 | B1 | * | 9/2002 | Hathcock | F16K 15/063 137/514.5 |
| 2007/0044848 | A1 | * | 3/2007 | Norman | F16K 15/063 137/542 |

* cited by examiner

DART VALVE WITH CENTRALIZER

TECHNICAL FIELD

The present disclosure relates generally to well stimulation equipment, and, more particularly, to a reverse flow check valve.

BACKGROUND

Hydraulic fracturing methods utilize pressurized liquid to fracture rocks to create cracks in deep-rock formations through which hydrocarbons will flow more freely. Fracturing manifolds are utilized to direct fracturing fluid or slurry from pumps to individual lines to be directed towards a desired formation. Reverse flow check valves or flapper valves can be utilized to prevent reverse flow between the pump and the fracturing manifold. For example, a reverse flow check valve can permit flow from the pump to the fracturing manifold, but can stop back flow from the fracturing manifold to the pump in case of equipment damage, failure, or other issues.

Reverse flow check valves can be used in high pressure applications (up to 15,000 psi) and can be exposed to vibration and fluid cavitation. However, one drawback of conventional reverse flow check valves and flapper valves is that conventional valves can be damaged by erosion, high pressure, vibration, and fluid cavitation. Damage to the conventional valves can lead to reduced performance and longevity. For example, flapper valves are commonly used to control flow between the fracturing manifold and the pump, but the sealing surfaces of such valves are prone to delamination or extrusion due to the extreme pressures and abrasive materials used in fracturing operations. Such damage to the sealing surfaces generally requires replacement of the valve, which also requires the fracturing operation to be interrupted while the valve is being replaced.

Dart valves may be used in an effort to avoid certain problems of flapper valves, but conventional dart valves suffer from additional drawbacks. For example, conventional dart valves can have reduced performance and longevity when arranged in a horizontal position, limiting the positioning and configuration of the fracturing manifold and other fracturing equipment. Due to the configuration of the other equipment, it is often necessary for the valve between the pump and fracturing manifold to be oriented in a horizontal position, which severely limits the usefulness of existing dart valves. Moreover, even in a vertical arrangement, conventional dart valves will often fail prematurely due to the turbulence of the fluid flow within the valve and the resulting vibration of the valve's internal components. Therefore, what is needed is an apparatus, system or method that addresses one or more of the foregoing issues, among one or more other issues.

SUMMARY OF THE INVENTION

A dart valve is disclosed. The dart valve includes an inlet centralizer to receive a stem extending from the cone body. The inlet centralizer can stabilize the movement of the cone body by constraining the radial movement of the cone body within the housing. Because the radial movement of the cone body is limited, wear and damage to the cone body and other components of the dart valve is minimized. The dart valve can be utilized in high pressure applications and can be used in horizontal and vertical orientations. Because of this, the dart valve can provide reliable operation in various arrangements.

BRIEF DESCRIPTION OF THE DRAWINGS

Various embodiments of the present disclosure will be understood more fully from the detailed description given below and from the accompanying drawings of various embodiments of the disclosure. In the drawings, like reference numbers may indicate identical or functionally similar elements.

DETAILED DESCRIPTION

Figure 1:
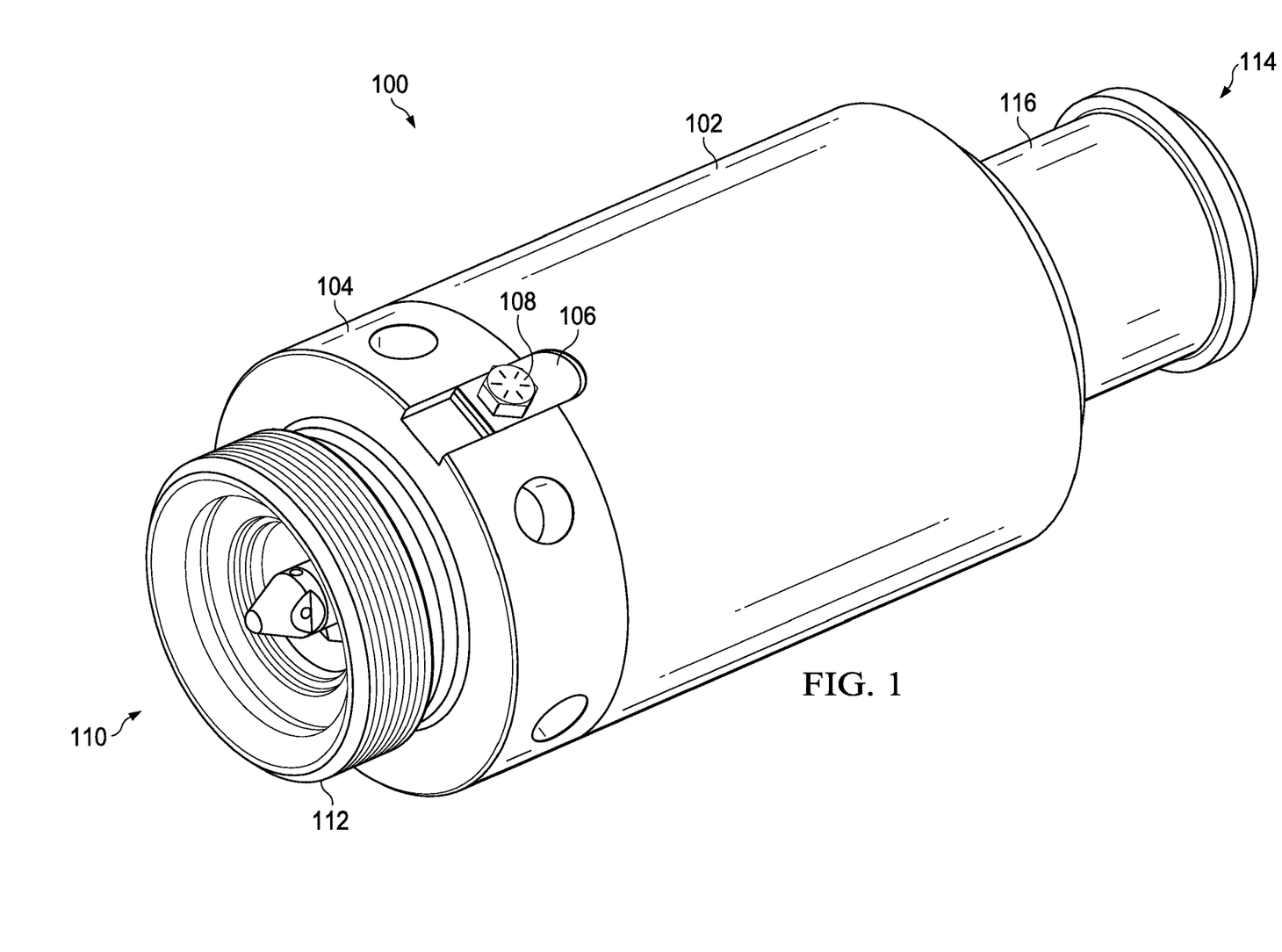
FIG. 1 is a perspective view of an embodiment of a dart valve.

FIG. 1 is a perspective view of an embodiment of a dart valve 100. In the illustrated embodiment, the dart valve 100 permits flow from the inlet 110 to the outlet 114, and prevents backflow from the outlet 114 towards the inlet 110. In some applications, embodiments of the dart valve 100 can be used as a reverse flow check valve for a fracturing manifold.

As illustrated, a flow line can be coupled to the inlet body 112 to allow fracturing fluid or slurry to enter the dart valve 100 at the inlet 110. Optionally, the inlet body 112 can be threaded to facilitate coupling. Fluid flow can exit the outlet 114 to a fracturing manifold or other equipment coupled to the outlet body 116. Advantageously, as described herein, features of the dart valve 100 permit the dart valve 100 to be arranged in a vertical or horizontal orientation, allowing for increased flexibility in equipment configuration without damaging the dart valve 100 or reducing longevity.

Figure 2:
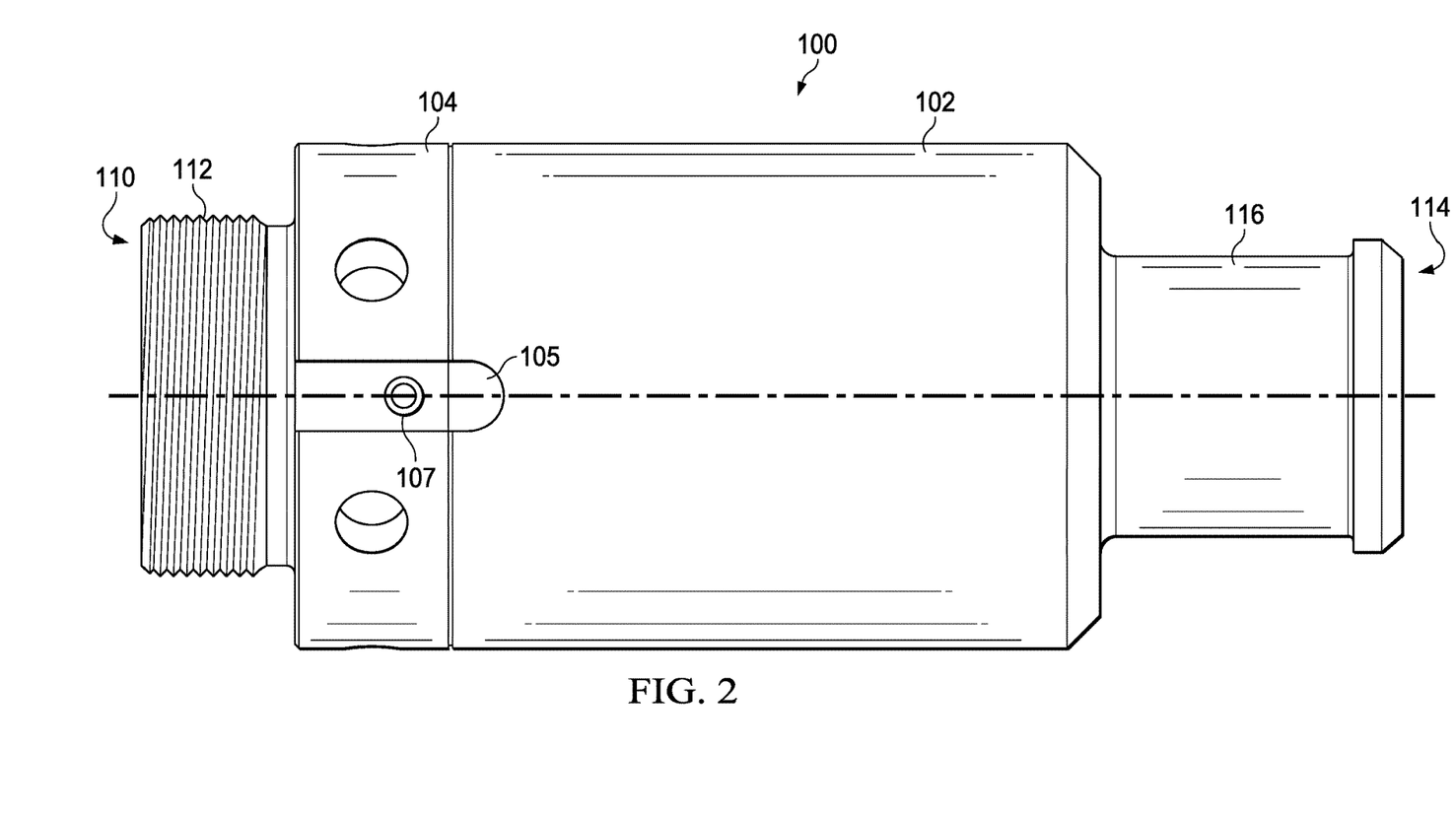
FIG. 2 is a top view of the embodiment of FIG. 1 with the key removed from the dart valve.

FIG. 2 is a top view of the embodiment of FIG. 1 with the key removed from the dart valve. With reference to FIGS. 1 and 2, in some embodiments, the inlet body 112 can extend from the top housing 104 of the dart valve 100. Optionally, the top housing 104 can be coupled to the housing 102 with a key 106 and a screw 108.

As illustrated, the key 106 can be disposed in the keyway 105 of the top housing 104 and the housing 102 to rotationally align the top housing 104 with the housing 102. The screw 108 can engage the through hole 107 to secure the key 106 in the keyway 105 and to secure the top housing 104 with the housing 102.

Figure 3:
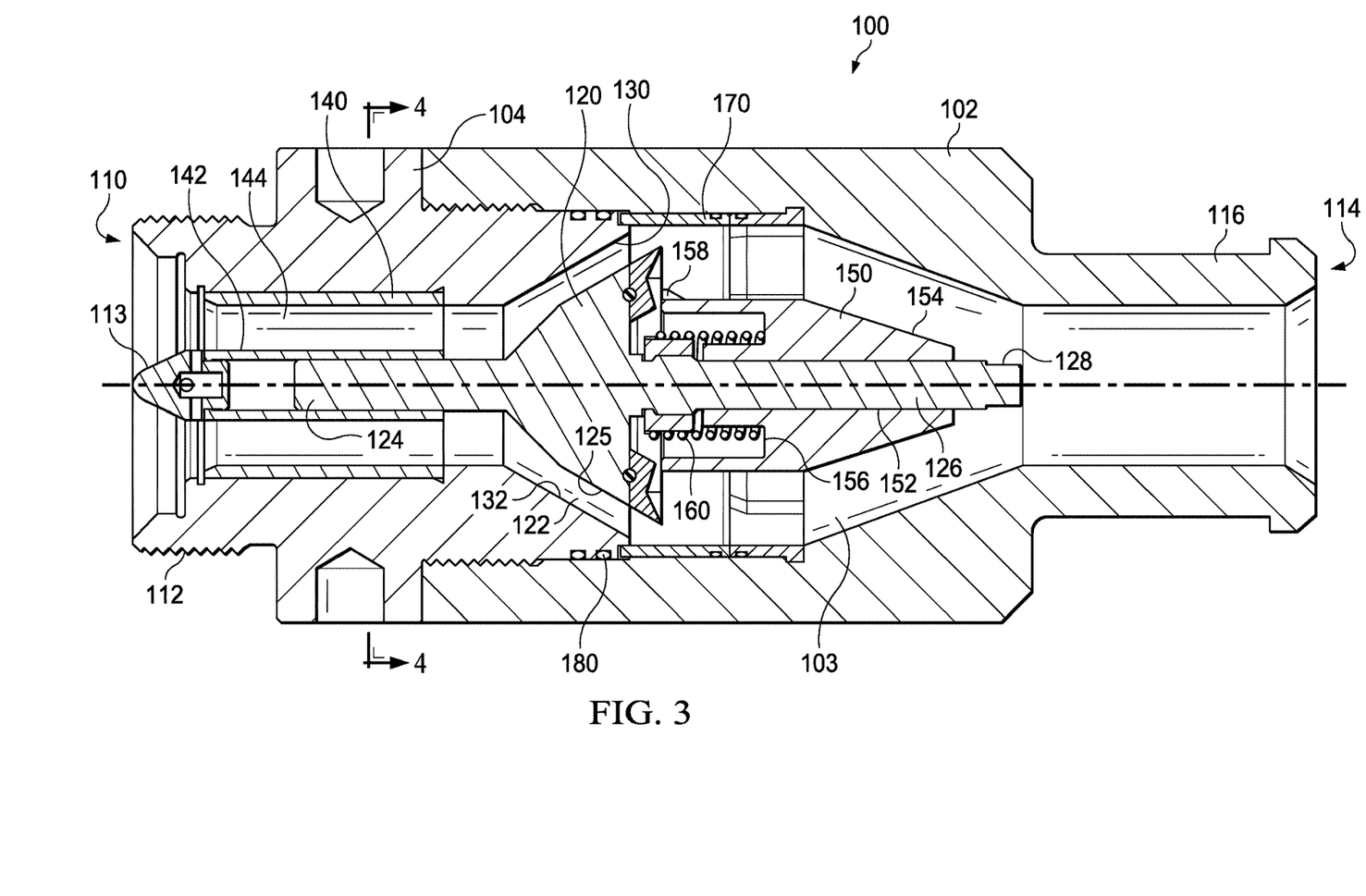
FIG. 3 is a cross-sectional view of the embodiment of FIG. 1 in a flow position.

FIG. 3 is a cross-sectional view of the embodiment of FIG. 1 in a flow position. As illustrated, fluid flow from the inlet 110 can apply force to the dart or cone 120 to axially space the cone 120 apart from the cone seat 130 to allow fluid flow to pass through the valve volume 103 and exit the dart valve 100 through the outlet 114.

In the depicted example, fluid flow enters the inlet 110 formed in the inlet body 112 and impinges upon the cone surface 125 of the cone 120. As illustrated, the cone 120 is urged or biased towards the cone seat 130 by a biasing member or spring 160. The spring 160 can engage against the cone 120 and a surface 156 to urge the cone 120 towards the cone seat 130.

During operation, in response to sufficient fluid force, the cone 120 is axially urged toward the outlet 114 end of the housing 102, compressing the spring 160 against the surface 156.

In the illustrated embodiment, as the cone 120 is axially urged, the cone 120 becomes spaced apart from the cone seat 130, defining a flow area 122 between the seat surface 132 and the cone surface 125. During operation, fluid can flow from the inlet 110, through the flow area 122 in the valve volume 103, and through the outlet 114. Advantageously, the flow area 122 defined by the seat surface 132 and the cone surface 125 can be optimized to reduce flow velocity past the cone seat 130 and the cone 120, preventing wash. In some embodiments, the flow may also pass through a flow ring 170 to prevent damage to the housing 102. Optionally, the flow ring 170 may be hardfaced.

With sufficiently high fluid forces acting upon the cone surface 125, the cone 120 may be forced against an axial seat 158. The axial seat 158 can prevent the cone 120 from travelling further within the valve volume 103. Further, the axial seat 158 can engage a surface of the cone 120 to stabilize the cone 120 and prevent radial movement, vibration, or oscillation of the cone 120 as fluid passes or cavitates within the valve volume 103.

In some embodiments, the cone 120 can be coated with or formed from hardened materials to allow slurry to be pumped through the dart valve 100 without premature wear or erosion. Optionally, the cone 120 can be hardfaced. Further, the cone surface 125 can be hardened or hardfaced. For example, the cone surface 125 can be formed from boron, or other suitable materials. Similarly, in some embodiments, the cone seat 130 can be formed from hardened materials or hardfaced materials to prevent premature wear or erosion.

In the illustrated embodiment, the dart valve 100 can include one or more features to constrain, prevent, or mitigate the angular or radial movement of the cone 120 within the dart valve 100. For example, the dart valve 100 can include an exit centralizer 150. The exit centralizer 150 can constrain the radial travel of the cone 120, while permitting the cone 120 to move in an axial direction. As illustrated, the exit centralizer 150 can be disposed within the valve volume 103, between the cone 120 and the outlet 114. In some embodiments, the exit centralizer 150 is tapered to permit flow past the exit centralizer 150 toward the outlet 114.

In the depicted example, the cone 120 can include an exit valve stem 126 that extends from the cone 120 toward the outlet 114. As illustrated, the exit valve stem 126 can extend through the exit centralizer channel 152. In some embodiments, the exit valve stem 126 includes a stepped portion 128.

In the illustrated embodiment, the exit valve stem 126 can be disposed within the exit centralizer channel 152. Accordingly, the exit centralizer 150 permits axial movement of the cone 120 by allowing the exit valve stem 126 to translate along the exit centralizer channel 152. However, angular or radial movement of the cone 120 causes the exit valve stem 126 to tilt or deflect and contact the walls of the exit centralizer channel 152, limiting the radial movement of the cone 120.

In some embodiments, features of the exit valve stem 126 and/or the exit centralizer channel 152 can be modified to further limit the tilting or deflection of the exit valve stem 126 within the exit centralizer channel 152, thereby limiting the radial movement of the cone 120. For example, the length of the exit centralizer channel 152 and/or the length of the exit valve stem 126 can be extended, further limiting the radial movement of the cone 120. Similarly, the tolerance between the exit valve stem 126 and the exit centralizer channel 152 can be reduced or tightened to further limit radial movement of the cone 120. Optionally, the exit valve stem 126 and/or the exit centralizer 150 can be formed from hardened materials.

Figure 4:
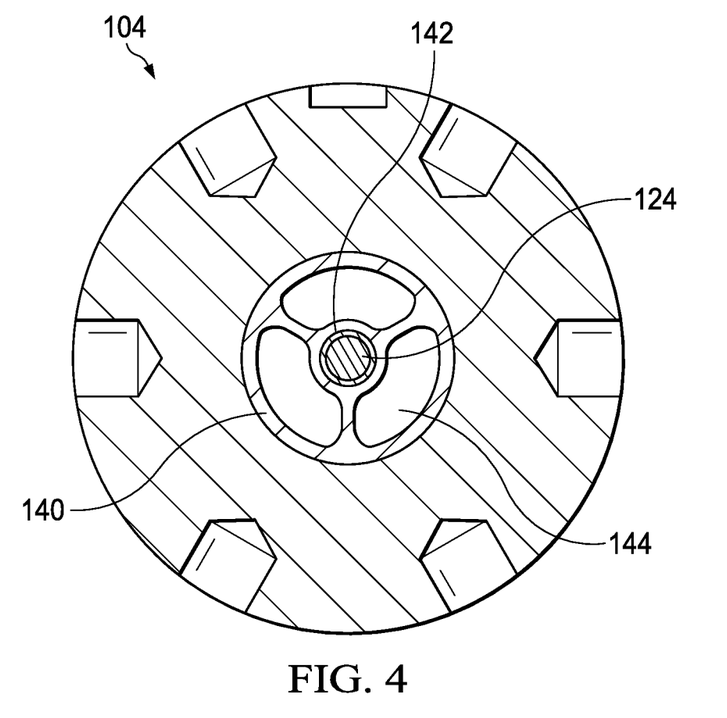
FIG. 4 is a cross-sectional view of an embodiment of an inlet centralizer of FIG. 3, taken along section lines 4-4.

FIG. 4 is a cross-sectional view of an embodiment of an inlet centralizer 140 of FIG. 3, taken along section lines 4-4. With reference to FIGS. 3 and 4, in the illustrated embodiment, the dart valve 100 can include an inlet centralizer 140. The inlet centralizer 140 can constrain the radial travel of the cone 120, while permitting the cone 120 to move in an axial direction. As illustrated, the inlet centralizer 140 can be disposed within the valve volume 103, between the inlet 110 and the cone seat 130.

In the depicted example, the cone 120 can include an inlet valve stem 124 that extends from the cone 120 toward the inlet 110. As illustrated, the inlet valve stem 124 can extend through the inlet centralizer channel 142. Optionally, the inlet centralizer 140 can include one or more flow channels 144. In some embodiments, the flow channels 144 can be circumferentially disposed around the inlet centralizer channel 142. Optionally, the inlet body 112 can include a bull nose 113 to direct fluid flow toward the flow channels 144 and away from the inlet centralizer channel 142.

In some embodiments, the inlet valve stem 124 can be disposed within the inlet centralizer channel 142. Accordingly, the inlet centralizer 140 permits axial movement of the cone 120 by allowing the inlet valve stem 124 to translate along the inlet centralizer channel 142. However, angular or radial movement of the cone 120 causes the inlet valve stem 124 to tilt or deflect and contact the walls of the inlet centralizer channel 142, limiting the radial movement of the cone 120.

In some embodiments, features of the inlet valve stem 124 and/or the inlet centralizer channel 142 can be modified to further limit the tilting or deflection of the inlet valve stem 124 within the inlet centralizer channel 142, thereby limiting the radial movement of the cone 120. For example, the length of the inlet centralizer channel 142 and/or the length of the inlet valve stem 124 can be extended, further limiting the radial movement of the cone 120. Similarly, the tolerance between the inlet valve stem 124 and the inlet centralizer channel 142 can be reduced or tightened to further limit radial movement of the cone 120. Optionally, the inlet valve stem 124 and/or the inlet centralizer 140 can be formed from hardened materials.

Advantageously, the inlet centralizer 140 and/or the exit centralizer 150 can stabilize and prevent radial movement of the cone 120 within the dart valve 100. In some embodiments, by utilizing both the inlet centralizer 140 and the exit centralizer 150, radial movement of the cone 120 can be further reduced. By stabilizing the cone 120, the dart valve 100 can withstand vibration and fluid cavitation imparted by fracturing pumps, preventing chattering, wallowing of materials, and improving the longevity of the dart valve 100 in a fracturing slurry environment. Further, the inlet centralizer 140 and/or the exit centralizer 150 can allow the cone 120 to be axially aligned within the dart valve 100, allowing for ease of actuation and allowing for the dart valve 100 to be used in a horizontal orientation.

Figure 5:
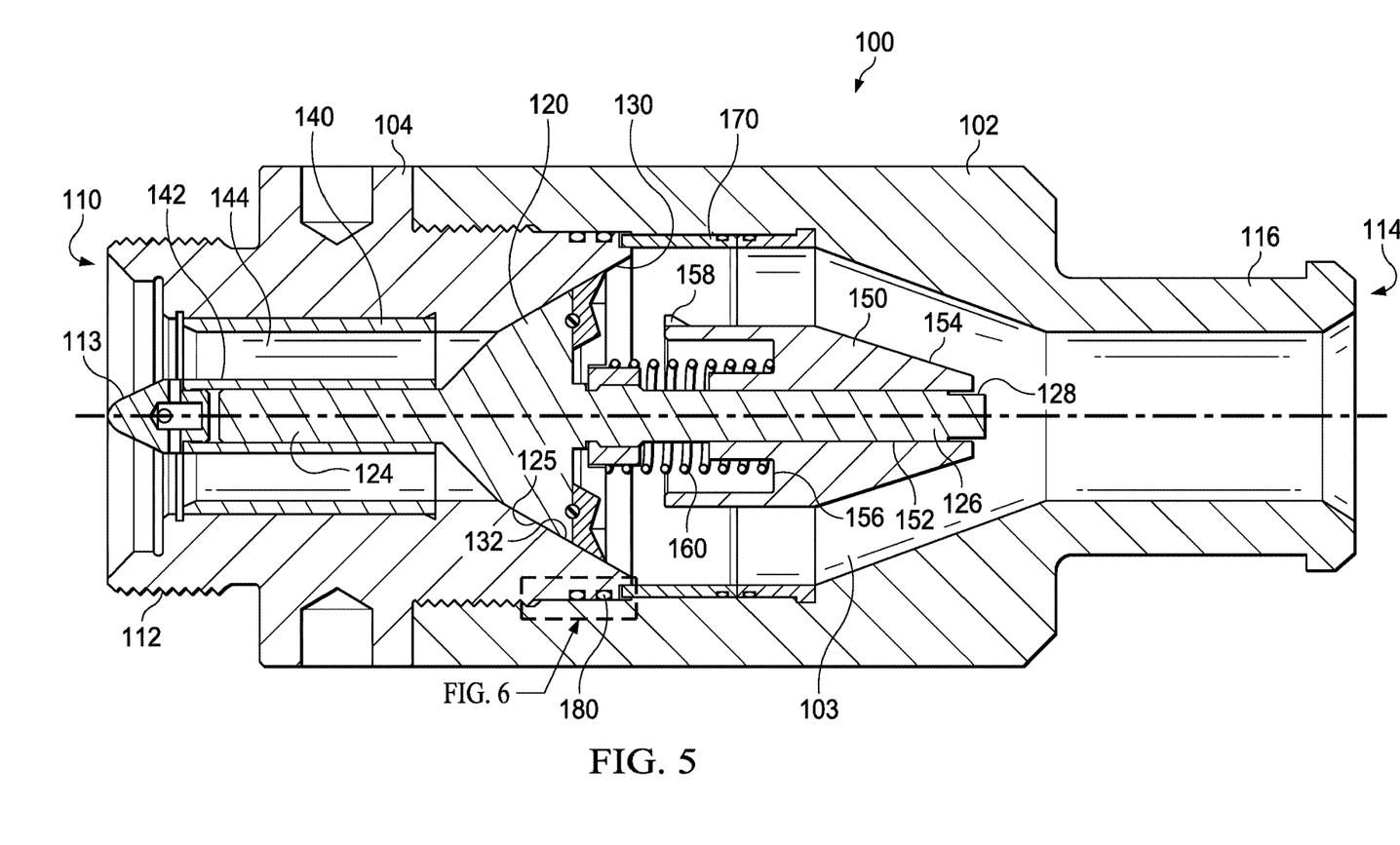
FIG. 5 is a cross-sectional view of the embodiment of FIG. 1 in a sealing position.

FIG. 5 is a cross-sectional view of the embodiment of FIG. 1 in a sealing position. As illustrated, the cone 120 is sealingly engaged to the cone seat 130 to prevent reverse or back flow from the outlet 114 from passing through the valve volume 103.

As can be appreciated, as the dart valve 100 cycles between a flow position and a sealing position, the inlet centralizer 140 and/or the exit centralizer 150 can allow the cone 120 to travel in an axial direction while limiting radial movement.

As previously described, the cone 120 is urged or biased towards the cone seat 130 by a biasing member or spring 160. Therefore, during operation, in the absence of sufficient inlet fluid flow or when back flow is received from the outlet 114, the cone surface 125 seals against the seat surface 132 to prevent fluid flow from passing therethrough. In some embodiments, the back flow from the outlet 114 can further force or engage the cone 120 against the cone seat 130.

Figure 6:
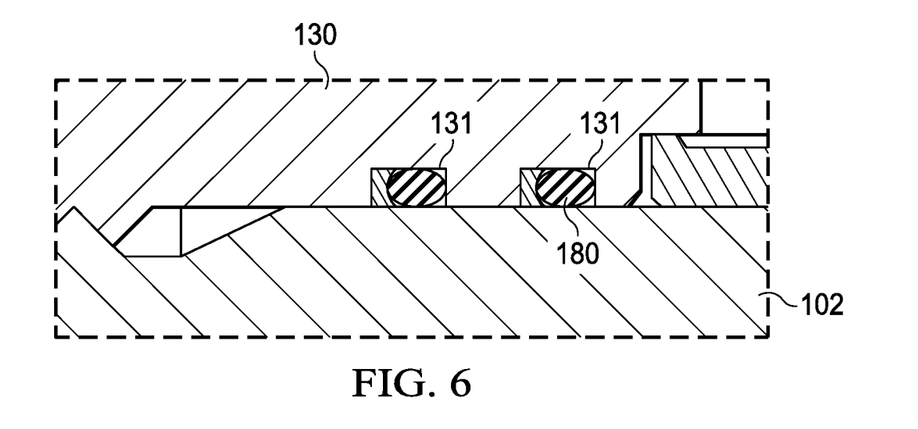
FIG. 6 is a detail view of an embodiment of the o-rings of FIG. 5.

FIG. 6 is a detail view of an embodiment of o-rings of FIG. 5. With reference to FIGS. 5 and 6, in some embodiments, the dart valve 100 can include o-rings 180 disposed between the cone seat 130 and the housing 102. The o-rings 180 can be seated in grooves 131 to prevent back flow from escaping or exiting the housing 102.

Figure 7:
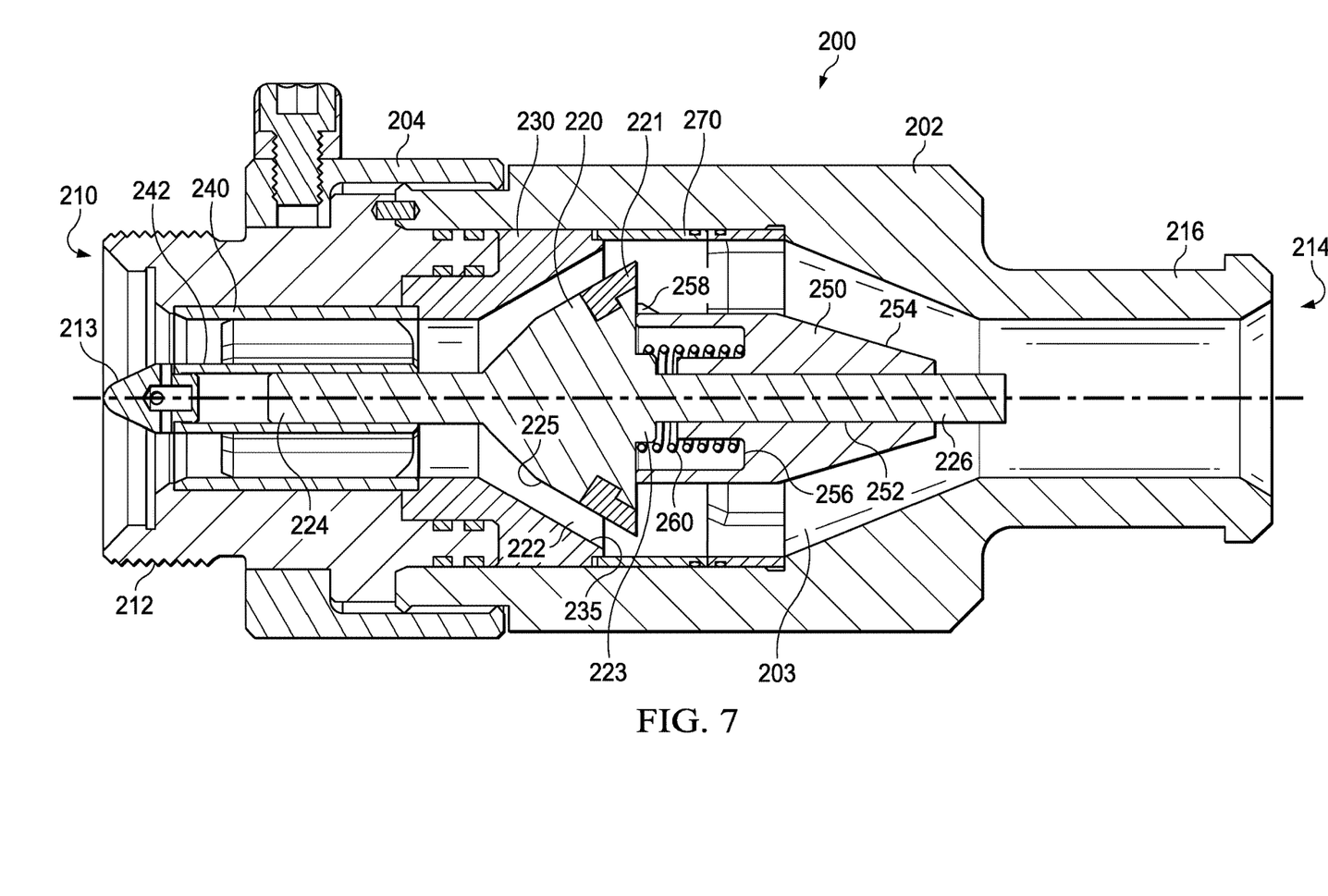
FIG. 7 is a cross-sectional view of an embodiment of a dart valve.

FIG. 7 is a cross-sectional view of an embodiment of a dart valve 200. In the illustrated embodiment, the dart valve 200 includes features that are similar to features previously discussed with respect to dart valve 100. Except where noted, similar features may be referred to with similar reference numerals and may reference corresponding descriptions.

As shown, the dart valve 200 includes a removable cone seat 230. In some embodiments, the cone seat 230 can be removed from the dart valve 200 and repaired, refurbished, and/or replaced. Advantageously, by utilizing a removable cone seat 230, the cone seat 230 can be formed from exotic wash resistant materials.

Optionally, the cone 220 can further include a polymer portion 221. The polymer portion 221 can be integrated with the cone surface 225 to increase the erosion resistance of the cone 220. In some embodiments, the polymer portion 221 can be formed from a polyurethane sealing material.

Additionally, the cone 220 can include a cone boss 223 that extends into the spring 260. The cone boss 223 can radially align the cone 220 with the spring 260 to further limit radial travel. Further, the cone boss 223 can stabilize the spring 260.

It is understood that variations may be made in the foregoing without departing from the scope of the present disclosure. In several exemplary embodiments, the elements and teachings of the various illustrative exemplary embodiments may be combined in whole or in part in some or all of the illustrative exemplary embodiments. In addition, one or more of the elements and teachings of the various illustrative exemplary embodiments may be omitted, at least in part, and/or combined, at least in part, with one or more of the other elements and teachings of the various illustrative embodiments.

Any spatial references, such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several exemplary embodiments, while different steps, processes, and procedures are described as appearing as distinct acts, one or more of the steps, one or more of the processes, and/or one or more of the procedures may also be performed in different orders, simultaneously and/or sequentially. In several exemplary embodiments, the steps, processes, and/or procedures may be merged into one or more steps, processes and/or procedures.

In several exemplary embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several exemplary embodiments have been described in detail above, the embodiments described are exemplary only and are not limiting, and those skilled in the art will readily appreciate that many other modifications, changes and/or substitutions are possible in the exemplary embodiments without materially departing from the novel teachings and advantages of the present disclosure. Accordingly, all such modifications, changes, and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112, paragraph 6 for any limitations of any of the claims herein, except for those in which the claim expressly uses the word "means" together with an associated function.

The invention claimed is:

1. A dart valve, comprising:
a housing defining a valve volume in fluid communication with an inlet and an outlet;
a cone seat disposed within the valve volume between the inlet and the outlet and comprising a seat surface;
an inlet centralizer disposed within the valve volume between the inlet and the cone seat, the inlet centralizer comprising:
an inlet centralizer body;
an inlet centralizer channel extending axially through the inlet centralizer body; and
a plurality of flow channels disposed circumferentially around the inlet centralizer channel; and
an exit centralizer disposed within the valve volume between the cone seat and the outlet, the exit centralizer comprising:
an exit centralizer body comprising an axial seat, wherein a cone body comprising a cone surface is configured to abut the axial seat when the cone body is spaced apart from the cone seat, such that the axial seat prevents oscillation of the cone body or further axial movement of the cone body away from the cone seat; and
an exit centralizer channel extending axially through the exit centralizer body, wherein the exit centralizer channel is spaced radially inward from the axial seat, such that an annular volume is disposed between the axial seat and the exit centralizer channel;
a cone assembly axially moveable relative to the cone seat, the cone assembly comprising:
the cone body;

a biasing member in engagement with the cone body, and disposed within the annular volume between the axial seat and the exit centralizer channel, wherein the biasing member is configured to bias the cone body toward the cone seat to sealingly engage the cone surface with the seat surface to prevent flow from the outlet to the inlet, and to compress to axially space the cone surface apart from the seat surface to permit flow between the inlet and the outlet; and an inlet stem axially extending from the cone body and at least partially into the inlet centralizer channel to constrain radial movement of the cone body.

2. The dart valve of claim 1, wherein the exit centralizer comprises a hardened material.

3. The dart valve of claim 2, the cone assembly further comprising:

an outlet stem axially extending from the cone body and at least partially into the exit centralizer channel to constrain radial movement of the cone body.

4. The dart valve of claim 3, wherein the outlet stem comprises a hardened material.

5. The dart valve of claim 1, wherein the exit centralizer body comprises a tapered body.

6. The dart valve of claim 1, wherein the cone seat comprises a hardfaced cone seat.

7. The dart valve of claim 1, wherein the inlet centralizer comprises a hardened material.

8. The dart valve of claim 1, wherein the inlet stem comprises a hardened material.

9. The dart valve of claim 1, wherein the cone surface comprises a polymer portion.

10. The dart valve of claim 1, further comprising a top housing coupled to the housing.

11. The dart valve of claim 10, further comprising an o-ring disposed between the top housing and the housing.

12. The dart valve of claim 9, wherein the polymer comprises a polyurethane sealing material.

13. The dart valve of claim 10, wherein the top housing comprises an inner surface exposed to the valve volume and further comprises a hardened flow ring disposed on a portion of the inner surface.

14. The dart valve of claim 1, wherein the inlet centralizer body further comprises a bull nose.

15. A dart valve, comprising:

a housing defining a valve volume in fluid communication with an inlet and an outlet;

a cone seat disposed within the valve volume between the inlet and the outlet and comprising a seat surface;

an inlet centralizer disposed within the valve volume between the inlet and the cone seat, the inlet centralizer comprising:

an inlet centralizer body; and an inlet centralizer channel extending axially through the inlet centralizer body;

an exit centralizer disposed within the valve volume between the cone seat and the outlet, the exit centralizer comprising:

an exit centralizer body comprising an axial seat, wherein a cone body comprising a cone surface is configured to abut the axial seat when the cone body is spaced apart from the cone seat, such that the axial seat prevents oscillation of the cone body or further axial movement of the cone body away from the cone seat; and an exit centralizer channel extending axially through the exit centralizer body, wherein the exit centralizer channel is spaced radially inward from the axial seat, such that an annular volume is disposed between the axial seat and the exit centralizer channel; and a cone assembly axially moveable relative to the cone seat, the cone assembly comprising:

the cone body;

a biasing member in engagement with the cone body and the exit centralizer and disposed within the annular volume between the axial seat and the exit centralizer channel, wherein the biasing member is configured to bias the cone body toward the cone seat to sealingly engage the cone surface with the seat surface to prevent flow from the outlet to the inlet, and to compress to axially space the cone surface apart from the seat surface to permit flow between the inlet and the outlet;

an inlet stem axially extending from the cone body and at least partially into the inlet centralizer channel to constrain radial movement of the cone body; and an outlet stem axially extending from the cone body and at least partially into the exit centralizer channel to constrain radial movement of the cone body.

16. The dart valve of claim 15, the inlet centralizer further comprising a plurality of flow channels disposed circumferentially around the inlet centralizer channel.

17. The dart valve of claim 15, wherein the cone seat comprises a hardfaced cone seat.

18. The dart valve of claim 16, wherein the cone surface comprises a polyurethane sealing material.

19. A dart valve, comprising:

a housing defining a valve volume in fluid communication with an inlet and an outlet;

a cone seat disposed within the valve volume between the inlet and the outlet and comprising a seat surface;

an inlet centralizer disposed within the valve volume between the inlet and the cone seat, the inlet centralizer comprising:

an inlet centralizer body; and an inlet centralizer channel extending axially through the inlet centralizer body;

an exit centralizer disposed within the valve volume between the cone seat and the outlet, the exit centralizer comprising:

an exit centralizer body comprising an axial seat, wherein a cone body comprising a cone surface is configured to abut the axial seat when the cone body is spaced apart from the cone seat, such that the axial seat prevents oscillation of the cone body or further axial movement of the cone body away from the cone seat; and an exit centralizer channel extending axially through the exit centralizer body wherein the exit centralizer channel is spaced radially inward from the axial seat, such that an annular volume is disposed between the axial seat and the exit centralizer channel;

a cone assembly axially moveable relative to the cone seat, the cone assembly comprising:

the cone body, wherein the cone surface comprises a polymer portion;

a biasing member in engagement with the cone body and disposed within the annular volume between the axial seat and the exit centralizer channel, wherein the biasing member is configured to bias the cone body toward the cone seat to sealingly engage the polymer portion of the cone surface with the seat surface to prevent flow from the outlet to the inlet, and to compress to axially space the cone surface apart from the seat surface to permit flow between the inlet and the outlet; and an inlet stem axially extending from the cone body and at least partially into the inlet centralizer channel to constrain radial movement of the cone body.

20. The dart valve of claim 19, the inlet centralizer further comprising a plurality of flow channels disposed circumferentially around the inlet centralizer channel.

21. The dart valve of claim 19 wherein the cone assembly further comprises an outlet stem axially extending from the cone body and at least partially into the exit centralizer channel to constrain radial movement of the cone body.

22. The dart valve of claim 19, wherein the cone seat comprises a hardfaced cone seat.

23. The dart valve of claim 19, wherein the polymer comprises a polyurethane sealing materials.

\* \* \* \* \*

UNITED STATES PATENT AND TRADEMARK OFFICE
CERTIFICATE OF CORRECTION

PATENT NO. : 10,641,062 B1  
APPLICATION NO. : 16/274063  
DATED : May 5, 2020  
INVENTOR(S) : Sendlak et al.

Page 1 of 1

It is certified that error appears in the above-identified patent and that said Letters Patent is hereby corrected as shown below:

On the Title Page

Item (73), should read:  
Assignee: C&J Spec-Rent Services Inc., Houston, TX (US)

Signed and Sealed this  
Seventeenth Day of November, 2020

Andrei Iancu  
*Director of the United States Patent and Trademark Office*